US006766302B2

(12) United States Patent
bach

(10) Patent No.: US 6,766,302 B2
(45) Date of Patent: Jul. 20, 2004

(54) METHOD AND APPARATUS FOR ADVERTISEMENT

(76) Inventor: Joseph bach, 17460 Lakeview Dr., Morgan Hill, CA (US) 95037

(*) Notice: Subject to any disclaimer, the term of this patent is extended or adjusted under 35 U.S.C. 154(b) by 0 days.

(21) Appl. No.: 10/384,966

(22) Filed: Mar. 8, 2003

(65) Prior Publication Data

US 2003/0149626 A1 Aug. 7, 2003

Related U.S. Application Data

(63) Continuation of application No. 09/207,005, filed on Dec. 7, 1998, now abandoned, which is a continuation of application No. 09/189,121, filed on Nov. 9, 1998.

(51) Int. Cl.[7] .............................................. G06F 17/60
(52) U.S. Cl. ........................................ 705/14; 705/38
(58) Field of Search ............................ 705/14, 38, 408; 283/904

(56) References Cited

U.S. PATENT DOCUMENTS

| | | | |
|---|---|---|---|
| 4,754,487 A | * | 6/1988 | Newmuis |
| 5,355,411 A | * | 10/1994 | MacDonald |
| 5,365,044 A | * | 11/1994 | Hesshaus |
| 5,471,925 A | * | 12/1995 | Heinrich et al. |
| 5,602,743 A | * | 2/1997 | Freytag |
| 5,731,980 A | * | 3/1998 | Dolan et al. |
| 5,787,406 A | * | 7/1998 | Arsenault et al. |
| 5,801,944 A | * | 9/1998 | Kara |
| 5,884,271 A | * | 3/1999 | Pitroda |
| 5,894,792 A | * | 4/1999 | Heinrich et al. |
| 5,932,869 A | | 8/1999 | Gottlich et al. ............. 235/493 |
| 5,978,781 A | * | 11/1999 | Sansone |
| 6,050,486 A | * | 4/2000 | French et al. |
| 6,175,626 B1 | * | 1/2001 | Aucsmith et al. |
| 6,321,214 B1 | * | 11/2001 | Thiel |

FOREIGN PATENT DOCUMENTS

JP          09223207 A   *  8/1997   .......... G06K/17/00

OTHER PUBLICATIONS

Kingson–Bloom, Jennifer, "For This New Visa, Only Web Surfers Need Apply," American Banker, p. 12, Feb. 20, 1998.*
Schroeder, Erica, "Kodak Marshals Photo CD Troops," PC Week, vol. 12, No. 14, p. 27(2), Apr. 10, 1995.*
"Kodak's Magnetic Mugs," Chain Store Age Executive, vol. 71, No. 6, p. 66, Jun. 1995.*
Extra Credit Like Vanity Plates and Bumper Stickers before them, custom credit cards are defining a whole new generation. William Porter; Denver Post; Oct. 5, 1997.
Capital One and World Championship Wrestling . . . PR Newswire, p. 1571; Oct. 1, 1998.
A Comparative Analysis of the Affinity Card Market in the USA and the UK. International Journal of Bank Marketing; vl3n5 pp. 12–23; 1995.

* cited by examiner

Primary Examiner—Susanna Meinecke-Diaz

(57) ABSTRACT

The invention provides methods for promoting ones business. According to one implementation, a promotional message is imprinted on the face of a charge card. According to another implementation, the promotional message is imbedded in a coding device and is fetched and displayed by the cash register. According to yet another implementation, the message is stored in a telephone unit, and is sent to a called subscriber whenever a call is placed. A similar implementation is described with respect to e-mail systems.

6 Claims, 4 Drawing Sheets

METHOD AND APPARATUS FOR ADVERTISEMENT

REFERENCE TO RELATED APPLICATIONS

This Application is a continuation of patent application Ser. No. 09/207,005 now abandoned, filed Dec. 7, 1998, which is a continuation of Ser. No. 09/189,121 still pending, filed Nov. 9, 1998.

BACKGROUND OF THE INVENTION

1. Field of the Invention

The invention relates to methods and apparatus for advertising services and merchandise. The method is particularly useful for sole proprietors and small businesses, although it can also be implemented by large businesses. The main thrust of the invention is the use of a credit card for advertisement purposes.

2. Description of the Related Art

The present invention is applicable to two different fields of prior art, which will be describe below. First, the invention is applicable to credit and debit cards, generally referred to herein as charge cards. These are generally known to the population and, therefore, need no be described herein in details. Suffice it to note that the cards generally have on their face two specific identifications: some form of identification of the issuing/sponsoring company, and some personal information of the card holder. For example, the issuing company is identified by the imprint of the company's name, e.g., American Express™. Similarly, an identification of the sponsoring company or program may be imprinted, such as the FORD logo on the Citibank Visa Ford sponsored program. The card holder is generally identified by his/her name only. Under one program, the picture of the card holder is also provided. All charge cards also include a coding device, such as a magnetic strip.

Recently, the internet has been used to solicit applications for credit cards. Generally, credit card issuers sponsor certain web pages. In return, they are provided a space to insert a "Radio Button" which serves as an advertisement for the sponsor and as a URL link to the issuer's credit card application program. Thus, when a user clicks on the Radio Button, his/her computer goes to the URL address of the card issuer and the user enters the credit card application program. The user is generally provided with information regarding the credit card, and can fill out an application online. During the run of the online application, the user may chose a program, such as variable of fixed interest rate, and the card's face (or background) design. Upon completion, the application is electronically available on the card issuer's computer system for processing and approval.

A second prior art field relating to the present invention is communication, especially cellular communication. The general technology of telephony and cellular (including PCI) technology is well known to those skilled in the art and will not be describe here in details, except for specifics relevant to the invention. One notable technology is usually referred to as "caller ID." According to that technology, the caller's number is sent (generally over the control channel) to the called subscriber unit, and is displayed while the unit is ringing. Thus, the called user knows who the caller is before answering the call. Moreover, advanced units allow the users to program name and numbers of people who usually call the subscriber. Then, whenever such a subscriber calls, the unit recognizes the caller's number, fetches its name from memory, and display the name when ringing. Thus, the called user can see the caller's name before answering. In other units, generally not cellular units, the caller's name is sent over the line from the telephone company's database.

SUMMARY OF THE INVENTION

The present invention takes advantage of generally existing technology to provide space and opportunity to advertise one's business and services. The disclosed invention is easy and inexpensive to implement, however, it may bring a very high return to the user.

Under a first implementation, an additional imprint is provided on the credit/debit card to prompt or encourage people to ask the holder about his/her business. For example, assuming the holder has an electronic repair shop, his credit card may have the inscription: "Is your VCR broken? Ask me about fixing it." Then, each time the holder presents his/her card for a credit charge, the person receiving the card sees the inscription and may be induced to ask the holder about fixing a VCR.

Under a second implementation, advantageous use is made of the caller ID feature in telephone systems. Continuing with the previous example, and assuming the owner's name is Tim Allen, his telephone unit is programmed to send a message each time the unit is used. For example, the message may be: "Ask him about fixing your VCR." Then, when a called subscriber receives a call from Tim, the caller ID unit will display the caller's name, i.e., Tim Allen, and the message, i.e., "Ask him about fixing your VCR." Thus, if the called subscriber indeed has a broken VCR, he/she will be reminded of that an will be encouraged to ask Tim about fixing it.

Under a third implementation of the invention, an e-mail system is pre-programmed so that every time an e-mail is sent, a promotion message is sent therewith to be displayed on the receiver's computer.

DETAILED DESCRIPTION OF THE INVENTION

Figure 1:
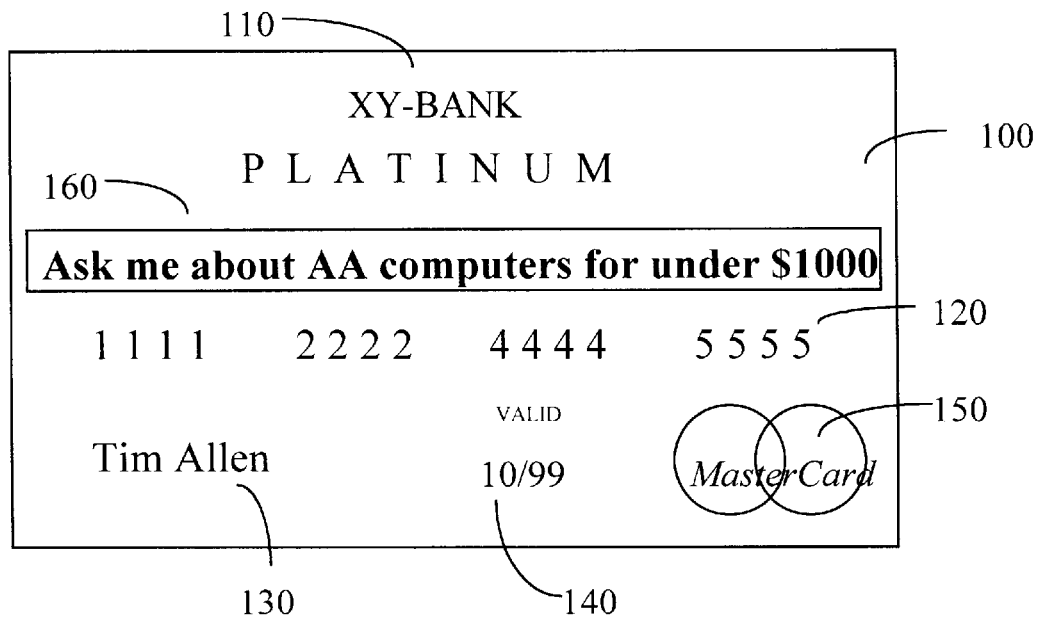
FIG. 1 is a schematic of a credit/debit card which includes the inscription according to a fist implementation of the invention.

FIG. 1 depicts a credit/debit card 100 according to a first implementation of the present invention. This implementation of the invention is intended to induce or encourage those receiving the card to ask the holder about his business or occupation. The card depicted in FIG. 1 includes all the conventional imprints on its face, identifying the issuing/sponsoring company and the card holder. Specifically, the sponsoring/issuing company or bank is identified at 110. The account number is specified at 120, the card holder's name is at 130, and the expiration date is at 140. Additionally, a logo of the card company is included at 150.

The card 100 depicted in FIG. 1 also includes an inscription 160, aimed at encouraging persons receiving the card to ask the holder about his/her business or occupation. Specifically, assuming that the card holder sells computers, the inscription 160 encourages each person receiving the card to ask the holder about the computers he is selling. Thus, each time the holder is using the credit/debit card to pay for merchandise or services, the person receiving the card for the purpose of processing the charge can read the inscription 160 and will be encouraged to ask the holder about computers.

It should be noted that the inscription 160 can be directly related to the holder's business or occupation. For example, in FIG. 1, AA may refer to the holder's own computer shop. On the other hand, the inscription 160 can also be directed to the holder's employer. Under this example, AA may be a large company employing the card holder. Specifically, it is known in the credit card industry to arrange special cards for special organizations. For example, members of the North Carolina Symphony can obtain credit cards especially arranged for the members with special credit conditions. Similar arrangements can be made with companies for issuance of cards to its employees. Thus, the AA computers company will have a special arrangement with the bank to issue cards to its employees, bearing the inscription such as exemplified in FIG. 1.

Under another implementation of the present invention, the message is included in the decoding device, e.g., the magnetic strip. Thus, when a person receives and scans the card for purpose of charging, the scanner reads the coding information stored in the coding device, including the message. The scanner then sends the fetched message to be displayed on the register's screen. This is particularly advantageous in cases where the scanner's screen is visible to all persons standing in line, such as in a grocery or convenient store line. Thus, the cashier and those standing in line may be prompted to inquire as to the card holder's business.

Figure 2:
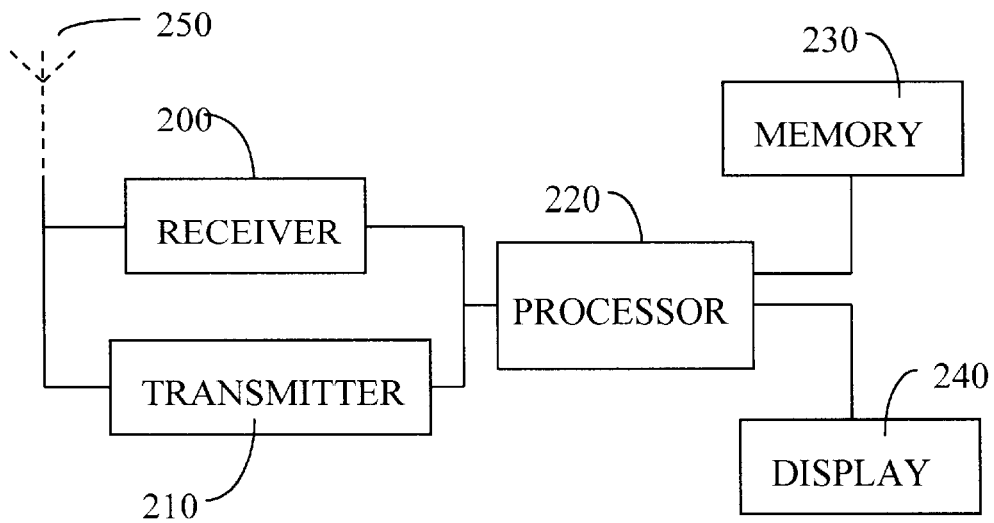
FIG. 2 is a block diagram depicting the basic constituents of a telephone unit implementing the present invention.

FIG. 2 depicts the basic elements of a telephone unit implementing an embodiment of the present invention. Specifically, the unit comprises a receiver 200, transmitter 210, processor 220, memory 230, and display 240. Also shown in broken line is antenna 250. This is done to exemplify both a land and a mobile telephone units in a single drawing. Specifically, if the it is a land unit, the receiver 200 and transmitter 210 will be connected to a land line, such as T1 or ISDN lines, as is well known in the industry. If the unit is mobile, the receiver/transmitter combination will be connected the antenna 250.

According to this example, the unit is capable of receiving and displaying a caller ID and a message according to the present invention. For example, the user may select to program information for persons who frequently call the user. This is enabled via the processor 220, which stores in memory 230 subscribers numbers and their respective names. Thus, when a called is received, the controller fetches the caller's number from the transmission signal received by receiver 200, and searches the memory 230 for a match. If a match is obtained, the corresponding pre-programmed name is fetched from the memory and sent to the display 240.

Additionally, the controller checks the received signal for the presence of a print message. If such exists, it is also sent to the display 240. In the preferred embodiment, if a name was fetched from the memory, it is displayed above, i.e., before the transmitted message. Thus, if Tim Allen is the caller and his number has been pre-programmed in the receiving unit, his name will be fetched and displayed, followed by the transmitted message, e.g., "Tim Allen, Ask me about AA computers for under $1000." If no match has been achieved, only the caller's number is displayed, followed by the transmitted message.

When the unit depicted in FIG. 2 is used to place a call, a message is transmitted with the called number (preferably over the control channel). For that purpose, the processor 220 enables the user to store a message in memory 230. Then, each time a call is placed, the processor fetches the stored message and send it together with the placement of the call. However, in the preferred embodiment, an override button is included in the unit to allow the user to cancel sending the message for a particular call.

As is known in the art, some service providers include a user ID service from their exchange or central office (i.e., PBX or CO). Thus, each subscriber's number is correlated to his/her name in a central memory. When such a subscriber places a call, his/her name is fetched from the central memory and sent to the called subscriber to be displayed. In such a case, when a call is received, the processor 220 need not match the received number to the numbers in memory 230, but can send the received name directly to the display, together with the received message.

Figure 3:
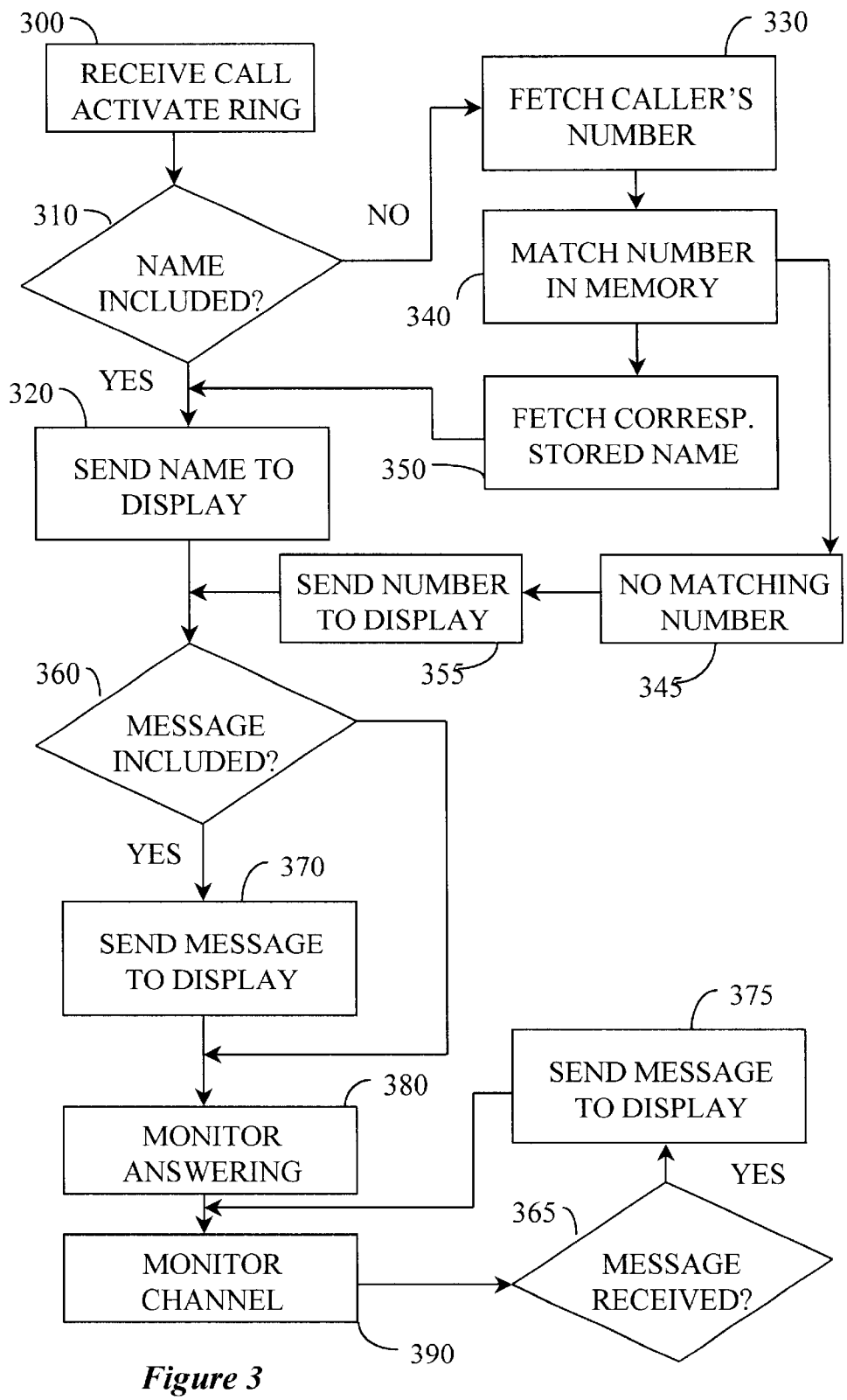
FIG. 3 is a flow chart exemplifying a process executed by the processor 220 shown in FIG. 2

FIG. 3 is a flow chart exemplifying a process executed by the processor 220 shown in FIG. 2. Specifically, when a call is received at step 300, the processor activates the ring. Then, it checks to see if a name is included in the transmission (step 310). If so, the name is fetched and sent to the display at step 320. Otherwise, the processor fetches the caller's number (step 330) and matches it with a number pre-programmed in memory 230 (step 340). If such a number is matched, the corresponding pre-programmed name is fetched (step 350) and sent to the display (step 320). If no matching number is found (step 345), then the received caller's number is send to the display (step 355).

The processor then checks to see if a message has been transmitted (step 360). If so, it is sent to the display (step 370), and then the processor monitors to see whether the user has answered the call. If no message has been included in the received transmission, the processor goes directly to the monitoring stage.

Two modifications of the above described process will now be explained. First, it should be appreciated that since the operation of the processor in fetching information and matching numbers is so fast as to appear instantaneous to the user, the processor can initiate the ring at any step and not necessarily at step 300. Also, it should be appreciated that the message need not be sent and/or received only at the origination of the call. Rather, the message can also be sent after a connection has been established (i.e., the call answered) or at any time during the conversation. This is exemplifying in FIG. 3 by the channel monitoring loop (steps 390, 365 and 375).

Figure 4:
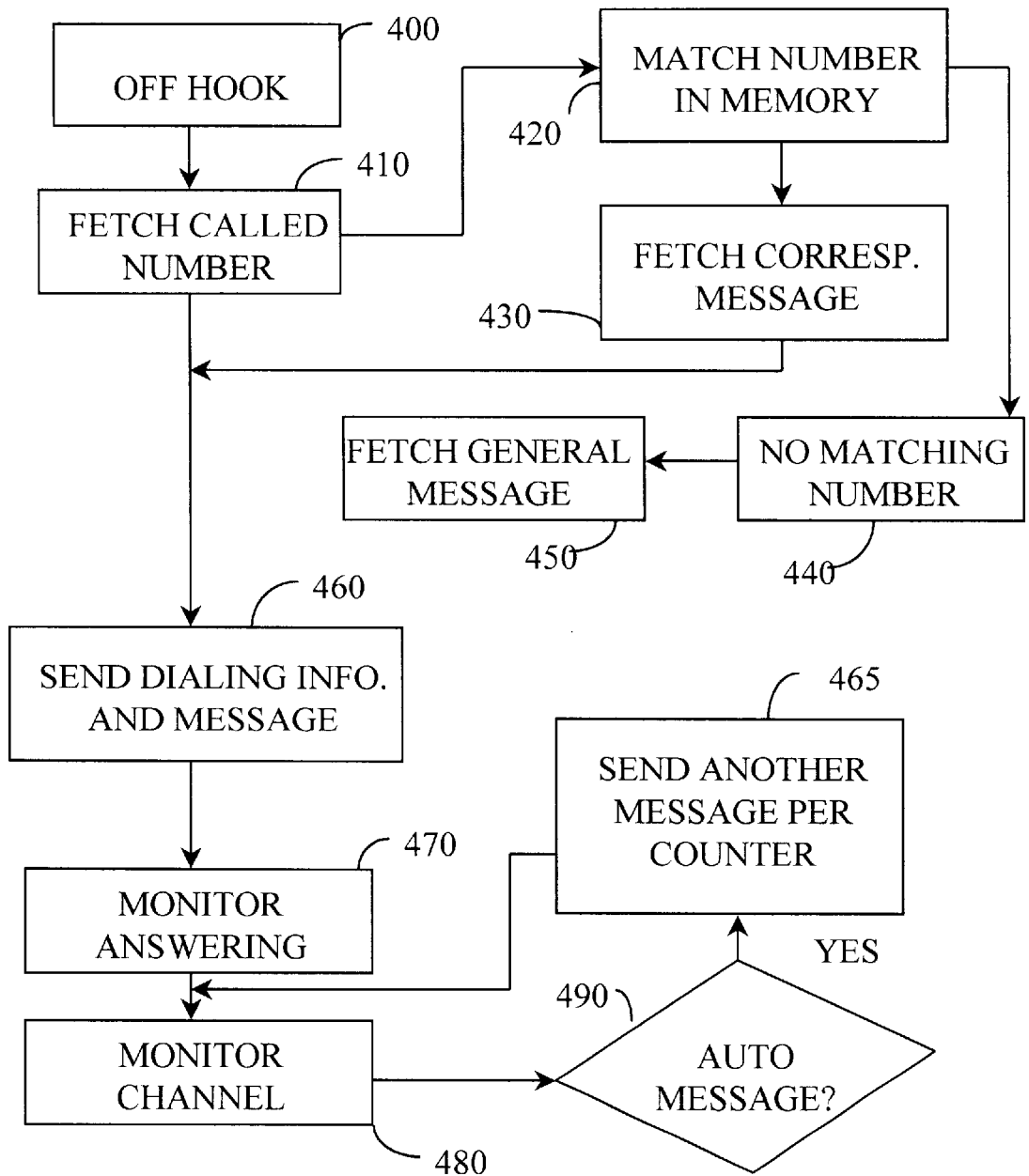
FIG. 4 is a flow chart depicting a process executed by the processor of FIG. 2 when a call is originated therefrom.

FIG. 4 is a flow chart depicting a process executed by the processor of FIG. 2 when a call is originated therefrom. Specifically, when a user initiates a call, i.e., off hook in a land unit or SEND in a mobile unit, the processor fetches the dialed number (step 410). In this preferred embodiment, several messages can be pre-programmed to be sent. Each message is linked to one or more stored numbers. Thus, the processor attempts to match the dialed number to one of the numbers in the memory (step 420). If a number is matched, the linked message is fetched (step 430) and is sent with the dialing information (step 460). If, however, no number is matched, the processor fetches a message that has been designated as a general message. Of course, this message can be one of the messages having links to other numbers, or it can be a message with no links.

In this embodiment the telephone unit is also equipped with the capability to send messages after the connection has been established and a conversation is under way (steps 470 and 480). In the preferred embodiment, if the automatic messaging has been enabled (step 490), the processor operates a counter and fetches a new message per the counter (step 465).

According to another implementation of the invention, a designated message is sent along with an e-mail message. That is, similar to the embodiments described with reference to FIGS. 2–4, a memory space is provided in a computer system for storing messages to sent along with sent e-mail messages. As with the above example, the messages can be linked to e-mail addresses and one or more messages can be designated as a general message. Whenever an e-mail is sent, the processor scans the memory for the receiver's address. If a match is found, the linked message is sent along with the e-mail message. If not, the general message is sent. It should be appreciated that the message can be in the form of an attachment, such as a "mini-program" attachment. For example, it can be an attachment of a program having a short audio-visual presentation.

Figure 5:
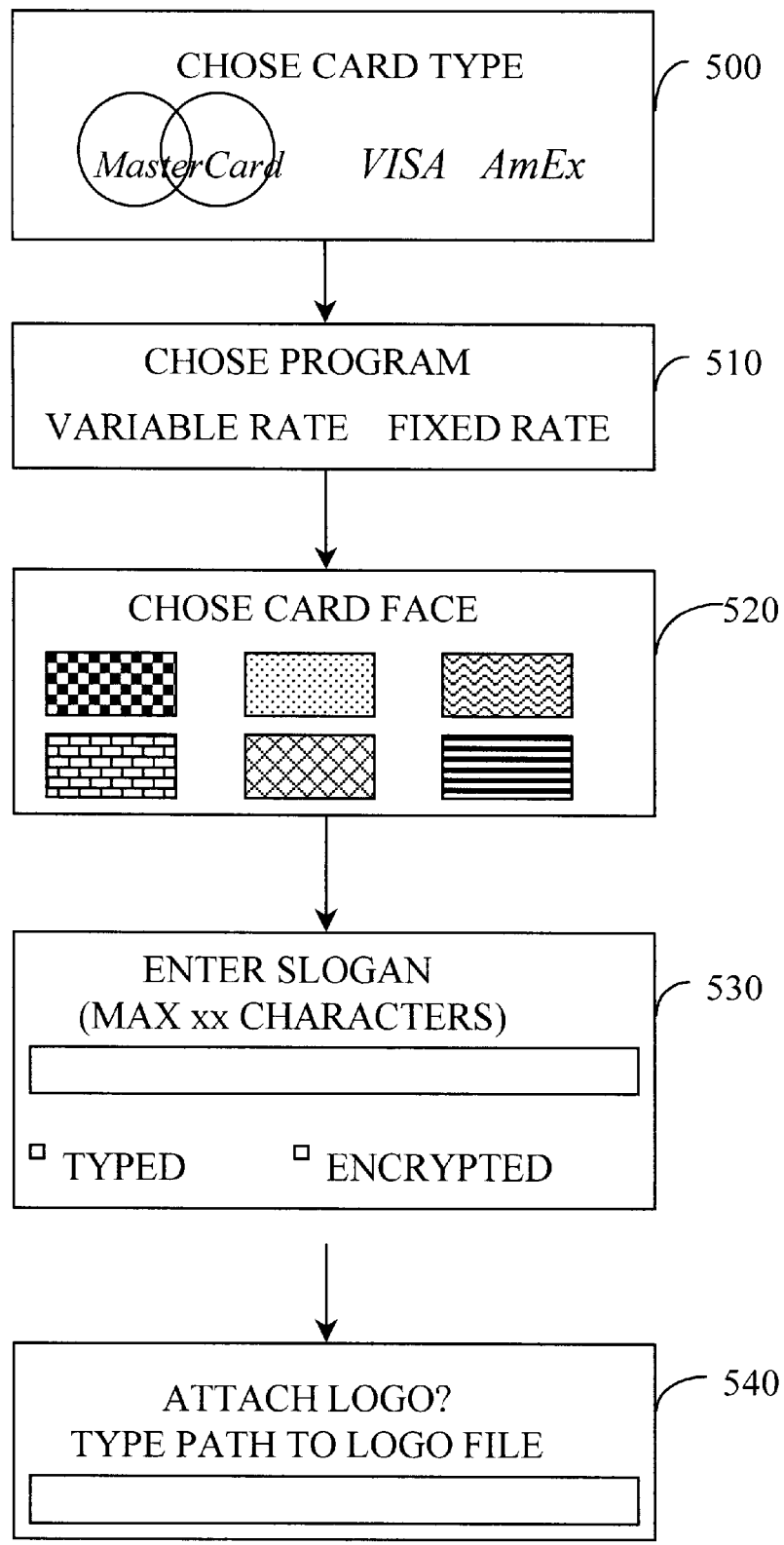
FIG. 5 is a flow chart depicting a process for credit card ordering over a computer system, such as the internet.

FIG. 5 depicts an exemplary embodiment of a computer program implementing a feature of the present invention. This program is particularly useful for processing credit card applications over the internet. As explained above, recently credit card issuers began advertising their cards over the World Wide Web. The advertisement is in what is generally known as a radio button which serves as an advertising space and a URL link to the issuer's web site. The linked site may be the issuer's general home web site, or it may be a site constructed specifically for the promotional program.

Upon linking to the site, the user may be provided with some promotional information regarding the cards and programs available. For example, some programs carry fixed interest rate, while others a variable interest rate. Still others may have an attractively low introductory rate, followed by a higher rate. The user may also be given a choice for the card's face design. For example, British Air provides several designs which match airplane tail art commissioned by British Air. The applicant is also prompt to enter various personal and financial information used to determine the credit worthiness of the applicant.

Referring back to FIG. 5, at 500 the user is prompted to chose the type of card he wishes to obtain. At 510, the user is prompted to select the card program, and at 520 to select the card's face design. According to an advantageous feature of the invention, at 530 the user is prompted to type in a slogan he wishes to appear on the card's face or encrypted on the card's magnetic strip. According to another feature, at 540 the user is prompter to type in the path to an image file of a logo he wishes to have on the card's face. Notable, such a file may be a JPEG, gif file, a jpg file, or any other conventional image file. The file is then retrieved and sent to the issuer's site as an attachment to the application, using a conventional method, such as a Java™ Applet. Of course, the image file may include the applicant's own picture, thereby serving as a security feature by including the applicant's picture on the face of the card.

While the invention has been described with reference to particular embodiments thereof, various embodiments and modification can be implemented by those skilled in the art without departing from the invention's scope and spirit, as defined in the appended claims.

What is claimed is:

1. A method for providing a personalized credit card and publicly displaying information decoded therein, comprising:

providing a user with an application for a credit card, said application including a slogan input field;

enabling a user to enter a user-slogan in said slogan input field;

accepting said application and producing a credit card comprising a substantially solid plastic body having a front and back faces;

providing a magnetic strip onto the back face of said credit card;

storing said user-slogan in said magnetic strip;

providing a user with a card reader having a display visible to third parties;

programming said card reader so that when said card reader reads said magnetic strip, said reader displays the user-slogan onto said display.

2. The method of claim 1, further comprising storing a security code onto said magnetic strip.

3. The method of claim 1, further comprising imprinting said user-slogan onto the front face of said credit card.

4. The method of claim 1, wherein the step of providing a user with an application for a credit card comprises providing an application on a web site and allowing said user to access the application via the internet.

5. The method of claim 4, wherein the step of enabling a user to enter a user-slogan in said slogan input field comprises programming said web site to prompt said user to type in a user-slogan.

6. The method of claim 5, further comprising enabling the user to provide a path to an image residing on the user's computer, and retrieving said image from the user's computer.

* * * * *